United States Patent [19]

Hunt et al.

[11] Patent Number: 5,682,992
[45] Date of Patent: Nov. 4, 1997

[54] ACCORDION PLEATED MEDIA STORAGE UNIT HAVING SEPARABLE POCKETS

[75] Inventors: Ronald Eugene Hunt, Georgetown; Verlon Eugene Whitehead, Austin, both of Tex.

[73] Assignee: CD3 Storage Systems, Inc., Round Rock, Tex.

[21] Appl. No.: 652,377

[22] Filed: May 23, 1996

[51] Int. Cl.$^6$ .......................... B65D 85/57; B65D 27/08
[52] U.S. Cl. .................... 206/309; 206/308.1; 206/425; 229/67.3; 229/72
[58] Field of Search .................. D6/407, 629, 630; 229/67.3, 72, 928; 206/309, 311, 312, 313, 308.1, 308.3, 425

[56] References Cited

U.S. PATENT DOCUMENTS

| D. 332,005 | 12/1992 | Walasek . | |
|---|---|---|---|
| 877,060 | 1/1908 | Douglas | 229/72 |
| 1,190,348 | 7/1916 | Westberg | 229/67.3 |
| 4,730,727 | 3/1988 | Petroff . | |
| 4,762,225 | 8/1988 | Henkel . | |
| 4,765,469 | 8/1988 | Seifert . | |
| 5,161,682 | 11/1992 | Seifert et al. . | |

FOREIGN PATENT DOCUMENTS 822305  10/1959  United Kingdom .................. 206/311

Primary Examiner—Byron P. Gehman
Attorney, Agent, or Firm—Andrew J. Dillon

[57] ABSTRACT

An accordion pleated media storage unit is provided which is constructed of a continuous elongate web of flexible material, such as a non-woven polyester spun material. A continuous zigzag fold of the elongate web creates multiple overlying planes, each of which has at least one edge which is integral with an adjacent plane. A bond is then formed along each edge of a pair of adjacent planes, extending from a common edge to a point just short of the mid-line of each plane, such that multiple adjacent pockets are formed which, when the unit is extended, are separated by a specified distance and wherein the pocket dimensions are not altered, greatly enhancing insertion and retrieval of a storage media element.

25 Claims, 5 Drawing Sheets

ACCORDION PLEATED MEDIA STORAGE UNIT HAVING SEPARABLE POCKETS

BACKGROUND OF THE INVENTION

1. Technical Field

The present invention relates in general to the field of media storage devices and in particular to accordion pleated media storage units capable of storing multiple storage media elements. Still more particularly, the present invention relates to accordion pleated media storage units having separable pockets which do not vary in dimension during separation, which greatly enhances insertion and retrieval of a storage media element.

2. Description of the Related Art

Recent advances in both audio and the computer arts have resulted in a proliferation of data which must be stored within portable storage media. Examples of such storage media include computer diskettes, compact disks, or various removable magnetic storage media. Each of these media stores large amounts of data utilizing either optical or magnetic techniques and each form of media is generally planar in physical dimension.

While many of the storage media described above are encased within a protective jacket which is integral with the storage media, the compact disk stores large amounts of data representing various voltage levels or digital signals as ultrafine, microscopic pits along a spiral path in a polymeric substrate, protected by an overlay of another thin polymeric layer. This technique has proven to be greatly superior to conventional phonograph records or tapes for storing digital data and while such disks are less vulnerable to scratching, dust and fingerprints the disk must still be protected during transport to avoid damage thereto.

Techniques for storing disk like media have been known in the prior art for decades. U.S. Pat. No 2,261,806 discloses a "carrier case and rack for phonograph records" which is reflective of the state-of-the-art in the 1930's. This application discloses a plurality of pockets enclosed within a brief case with the pockets linked such that the pockets automatically fold out when the case is opened.

U.S. Pat. No 2,777,574, issued to Brody discloses a holder for phonograph records which is designed as an alternative to the album cover and record jacket arrangement commonly used with phonograph records. Brody attempts to provide means for protecting a record sheath from scratching or frictional wear by providing an outer protective envelope made of plastic material to be placed over the record sheath.

More recently, U.S. Pat. No 4,538,730 issued to Wu discloses a storage box for computer floppy disks which includes collapsible storage bags, linked at their edges for extensibility. In this manner separation is provided between pockets in order to protect the floppy disk.

More recently, U.S. Pat. No 4,762,225 discloses a compact disk guard and carrying system which provides a collapsible enclosure having a mouth portion, extensible side portions, a V-shaped vertex portion and a securable fold over cover which creates an elongated, substantially rigid, yet foldable substrate which forms a series of pockets within which a compact disk may be stored.

While each of the aforementioned patents demonstrates a useful technique for storing a plurality of storage media elements, those having ordinary skill in the art will appreciate that it would be greatly advantageous to provide an increased storage density within such a storage element, such that a larger number of storage media elements may be stored therein. Further, with increased density of storage, the problems associated with insertion and retrieval of storage media elements is exacerbated. Consequently, it would be desirable to create a storage unit which is designed so as to assist the user in the insertion and retrieval of storage media elements which are stored therein in a high density format.

SUMMARY OF THE INVENTION

It is therefore one object of the present invention to provide an improved media storage device.

It is another object of the present invention to provide an improved accordion pleated media storage unit.

It is yet another object of the present invention to provide an improved accordion pleated media storage unit having separable pockets.

The foregoing objects are achieved as is now described. The accordion pleated media storage unit of the present invention is constructed of a continuous elongate web of flexible material, such as a non-woven polyester spun fabric. A continuous zigzag fold of the elongate web creates multiple overlying planes, each of which has at least one edge which is integral with an adjacent plane. A bond is then formed along each edge of a pair of adjacent planes, extending from a common edge to a point just short of the mid-line of each plane, such that multiple adjacent pockets are formed which, when the unit is extended, are separated by a specified distance and wherein the pocket dimensions are not altered, greatly enhancing insertion and retrieval of a storage media element.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
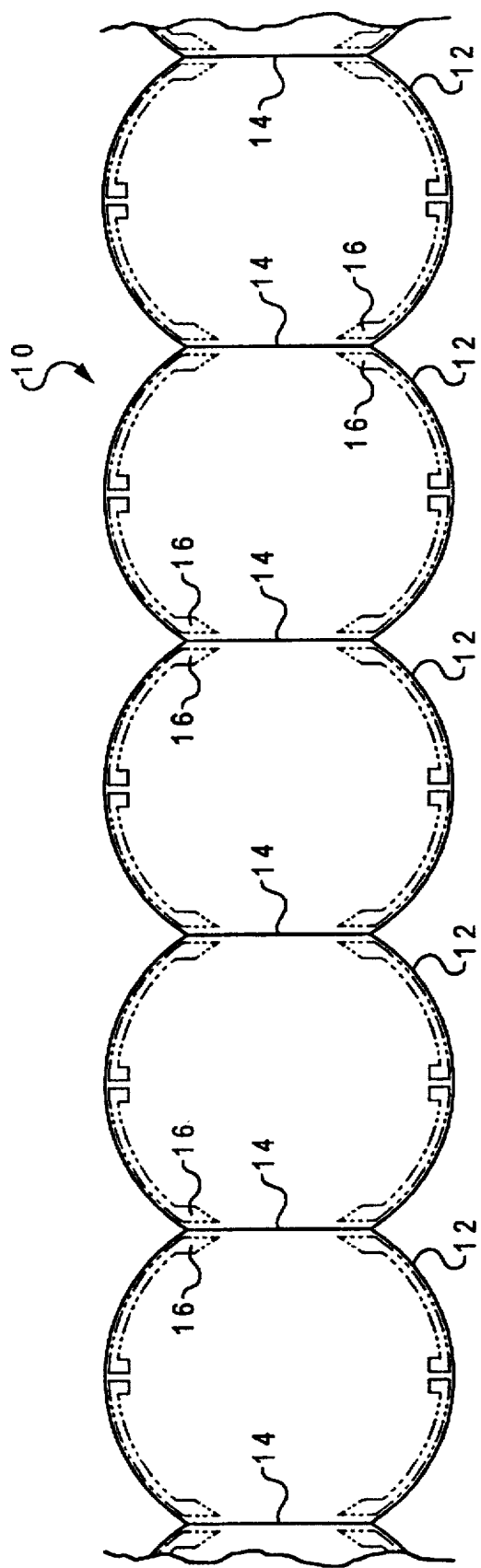
FIG. 1 is a plan view of an elongate flexible web which may be utilized to construct the media storage unit of the present invention.

With reference now to the figures and in particular with reference to FIG. 1, there is depicted a plan view of an elongate flexible web 10 which may be utilized to construct the media storage unit of the present invention. As illustrated, media storage unit 10 may be divided into a plurality of planes 12 which are generally circular in shape. However, those having ordinary skill in the art will appreciate, upon reference to the present specification, that each plane 12 may comprise a generally rectangular shape as well.

Elongate flexible web 10 may, in accordance with one preferred embodiment of the present invention, be constructed of a suitable flexible cloth-like material such as non-woven polyester spun fabric which is lint free and which will not scratch the highly polished surface of a compact disk. One example of such a fabric is Sontara™, manufactured by DuPont Corporation. Alternatively, other fabric or paper materials may be utilized, including plastics or other such materials.

Still referring to FIG. 1 it may be seen that each of the planes 12 shares a common edge 14 which is integral with an adjacent plane 12. Further, a series of bond areas 16 are illustrated within each plane 12. Each bond area 16 delineates that portion of each plane 12 which, when elongate flexible web 10 is folded in a continuous zigzag fashion, will be utilized to bond two overlying planes 12 together. As noted, each bond area begins along at one end of common edge 14 and proceeds along the edge of plane 12 to a specific location which will be specified with greater detail herein. Of course, the bond created within each bond area 16 need not be continuous in nature.

Figure 2:
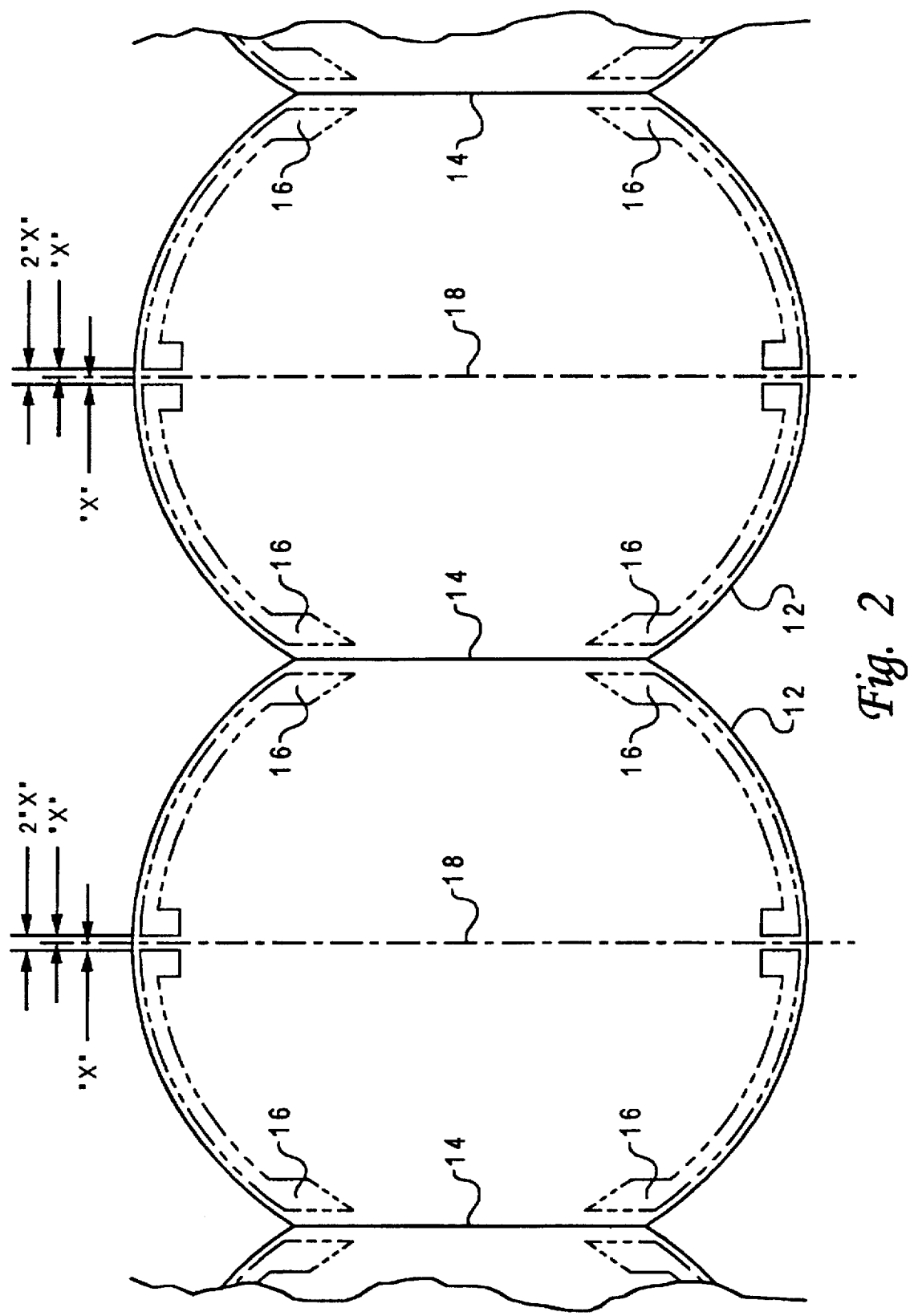
FIG. 2 is an enlarged plan view of a portion of the elongate flexible wed of FIG. 1.

Referring now to FIG. 2, there is depicted an enlarged plan view of a portion of elongate flexible web 10 of FIG. 1. As illustrated, two adjacent planes 12 are depicted meeting at integral edge 14. As is more clearly illustrated within FIG. 2, a continuous zigzag fold may be created within an elongate flexible web 10 along each common edge 14 forming a series of overlying planes 12. Each overlying plane 12 will then include a bottom edge, two side edges and a top edge. Thereafter, each bond area 16 within each two adjoining planes may be utilized to create a bond between each two adjoining planes extending from a bottom common edge 14 to a point which is just short of midline 18 of each plane 12, forming the lower half of a media storage packet. The bond created between two adjacent bond areas 16 may be, as those skilled in the art will appreciate, created utilizing glue, sonic welding or that bond may be sewn utilizing an appropriate technology.

In accordance with an important feature of the present invention, the bond formed between two adjacent overlying planes 12 extends from bottom common edge 14 to a point which is X inches short of midline 18. In this manner, a plurality of adjacent pockets may be formed which, when extended as will be illustrated in greater detail herein, are separated by 2X inches in distance at the top half of each packet, while maintaining a constant dimension in the lower half of each pocket, greatly facilitating the insertion and retrieval of storage media into a pocket formed in this manner.

Figure 3:
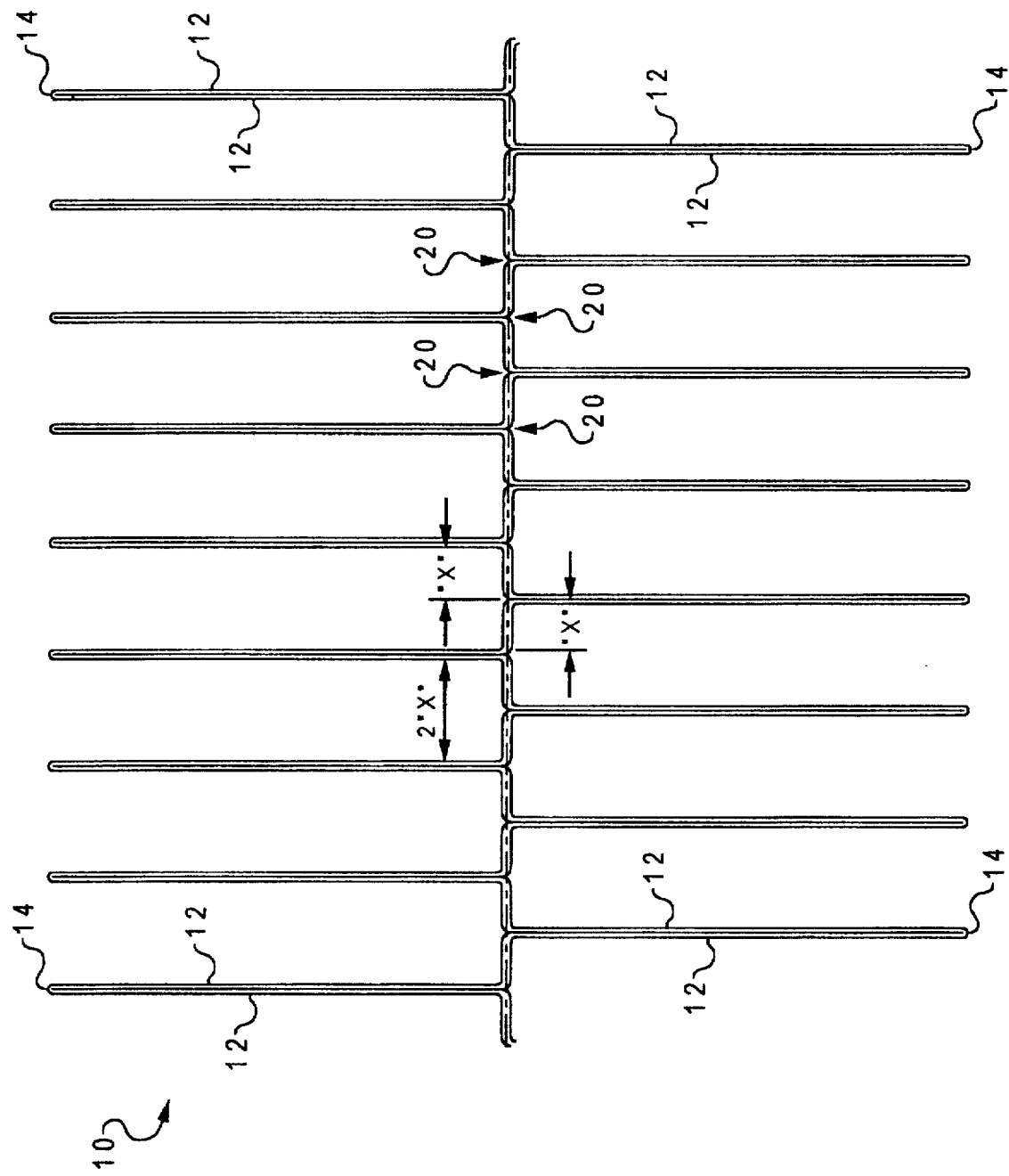
FIG. 3 is a side view of a media storage unit constructed in accordance with the present invention.

With reference now to FIG. 3, there is depicted a side view of a media storage unit which is constructed in accordance with the present invention. As illustrated herein, each pair of overlying planes 12 which share an integral bottom common edge 14 form a storage pocket 20 when bond area 16 has been bonded utilizing one of the suggested techniques. Thus, as illustrated within FIG. 3, when the media storage unit is extended each pocket 20 is separated from an adjacent pocket 20 by a distance of 2X inches, greatly facilitating the insertion and retrieval of a storage media within that pocket. In accordance with the preferred embodiment of the present invention the dimension X comprises ¼ inch and thus, the dimension 2X is ½ inch; however, those skilled in the art will appreciate that a greater or lesser separation of adjacent pockets may be accomplished, so long as a sufficient separation between adjacent pockets is created to permit efficient insertion and retrieval of storage media within a pocket. It should also be noted that when an accordion pleated media storage unit is formed in this manner, two alternate sets of storage pockets 20 may be formed on opposite sides of elongate flexible web 10, greatly enhancing the number of storage media elements which may be accommodated. Of course, if it is desired to create only a single set of storage pockets on one side of elongate flexible web 10, the bottom edge bond between two adjacent overlying planes may be extended above the midline of each plane, so long as a gap exists between the upper point of bonding of each storage pocket thus formed and the lower point of a top edge bond.

Figure 4:
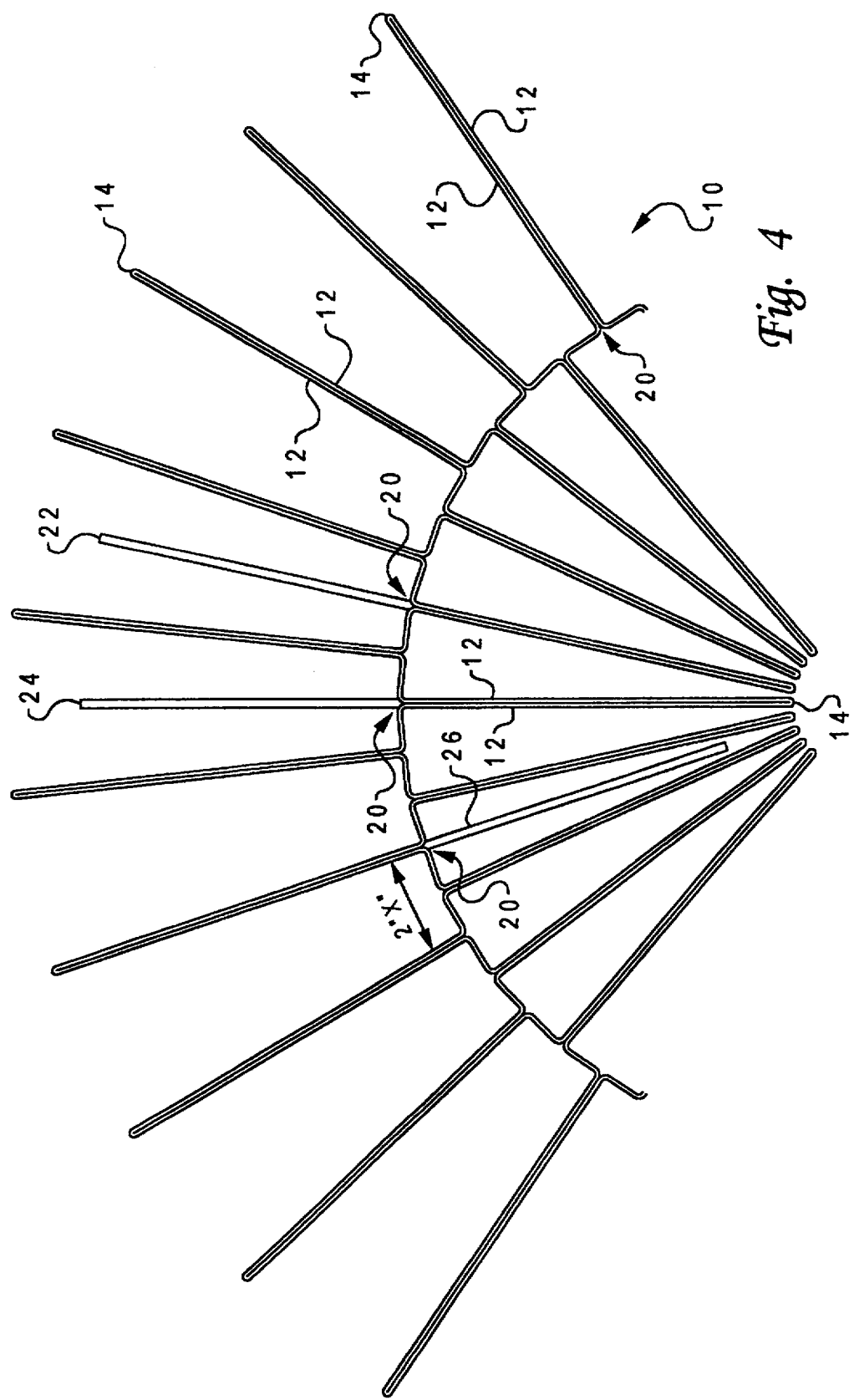
FIG. 4 is a side view of the media storage unit of FIG. 3, fanned open in a first direction to expose a first half of the storage pockets created therein.

Next, referring to FIG. 4, there is depicted a side view of the media storage unit of FIG. 3, fanned open in a first direction to expose a first half of the storage pockets created therein. As illustrated, when fanned open in the direction depicted within FIG. 4, multiple storage media elements, such as elements 22 and 24 may be inserted into various storage pockets 20 with great facility. This facility occurs as a result of the novel design of the accordion pleated media storage unit which permits the upper half of each storage pocket to be fanned open, while maintaining a constant dimension in the lower half of each storage pocket. Further, by providing a storage pocket in which the dimensions of the upper half of the pocket may vary, while maintaining as constant the dimensions of the lower half of each pocket, each media storage element 22 or 24 is firmly held in the center of the aperture into storage pocket 20, as illustrated in FIG. 4, greatly facilitating insertion and retrieval of a media storage element. Those having ordinary skill in the art will appreciate that each media storage element 22 and 24 may comprise a compact disk, a floppy disk, or any other suitable media storage device which is either circular or rectangular in shape.

As further illustrated within FIG. 4, a second plurality of storage pockets 20 exists within the lower half of the media storage unit and as depicted, a media storage element, such as element 26 may be inserted into one of the pockets thus formed. In this manner, the density within which multiple media storage elements may be stored is substantially increased.

Figure 5:
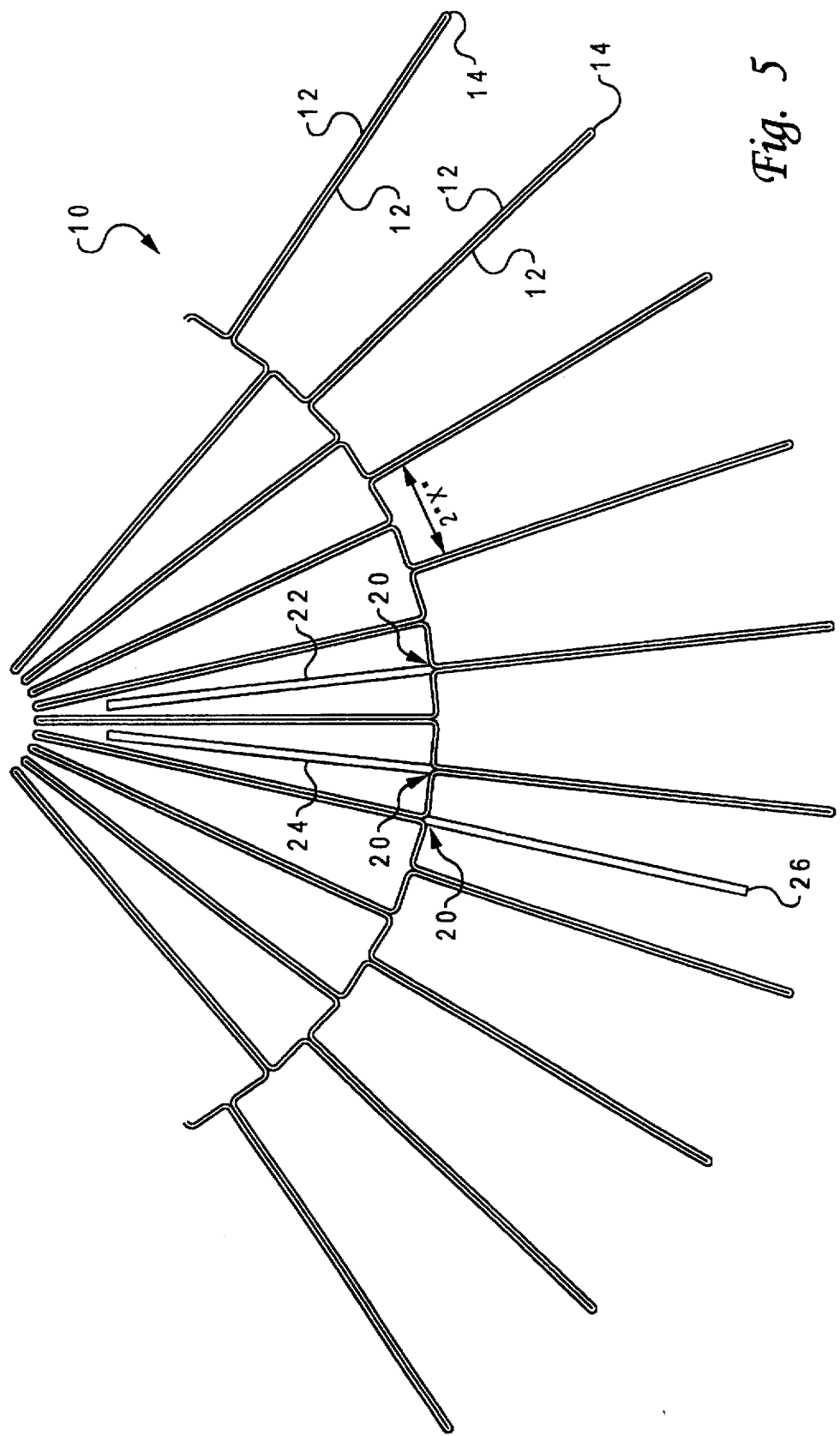
FIG. 5 is a side view of the media storage unit of FIG. 3, fanned open in a second direction to expose a second half of the storage pockets created therein.

Finally, with reference to FIG. 5, there is depicted a side view of the media storage unit of FIG. 3, fanned open in a second direction to expose a second half of the storage pockets created therein. As depicted within FIG. 5, media storage elements 22 and 24 are now substantially enclosed within a storage pocket 20 and media storage element 26 is easily accessible within its associated storage pocket 20.

As the dimensions of the upper half of the aperture into this storage pocket have been expanded by the fanning of the media storage unit, and as the dimensions of the lower half of storage pocket 20 have been maintained, media storage element 26 is held in place in the center of its storage pocket, greatly enhancing insertion and retrieval.

Thus, as those having ordinary skill in this art will appreciate, the media storage unit of the present invention may be utilized to efficiently store a large number of storage media by a creating a plurality of storage pockets, each of which is separated from an alternate storage media element by a single layer of fabric.

Upon reference to the foregoing those skilled in the art will appreciate that the Applicants herein have created an accordion pleated media storage unit which includes pockets which are separable by a defined distance at the upper half thereof, while maintaining a fixed dimension of the lower half of each storage pocket, maintaining each media storage element which has been inserted into a pocket within the center of the aperture, greatly enhancing the efficiency of insertion and retrieval of a storage media element within adjacent pockets and which permits a large number of storage media elements to be stored within such a unit by virtue of a plurality of mirror image storage pockets created on each side of the resultant media storage unit.

While the invention has been particularly shown and described with reference to a preferred embodiment, it will be understood by those skilled in the art that various changes in form and detail may be made therein without departing from the spirit and scope of the invention.

What is claimed is:

1. An accordion pleated extendable media storage unit comprising:

an elongate web of flexible material;

a continuous zigzag fold within said elongate web of flexible material forming a plurality of overlying planes, each of said plurality of overlying planes having a bottom edge, two side edges, and a top edge and wherein at least one of said edges is integral with an adjacent overlying plane; and a bond between each two adjacent overlying planes above each bottom edge which is integral with an adjacent overlying plane, at each end thereof, terminated at a selected point on each side edge of each two adjacent overlying planes wherein a plurality of adjacent storage pockets are formed, which, when said storage unit is extended, expand in dimension above said selected point while remaining constant in dimension below said selected point such that a storage media element inserted within a selected storage pocket will remain centered within said selected storage pocket during extension of said storage unit.

2. The accordion pleated extendable media storage unit according to claim 1, wherein said elongate web of flexible material comprises cloth.

3. The accordion pleated extendable media storage unit according to claim 2, wherein said cloth comprises non-woven polyester spun material.

4. The accordion pleated extendable media storage unit according to claim 1, wherein each of said overlying planes is generally circular in shape.

5. The accordion pleated extendable media storage unit according to claim 1, wherein said bond is formed utilizing a sonic welding technique.

6. The accordion pleated extendable media storage unit according to claim 1, wherein said bond is formed by sewing.

7. The accordion pleated extendable media storage unit according to claim 1, wherein said bond is formed utilizing glue.

8. The accordion pleated extendable media storage unit according to claim 1, wherein said bond is continuous from each bottom edge which is integral with an adjacent overlying plane, at each end thereof, to said selected point on each side edge of each two adjacent overlying planes.

9. An accordion pleated extendable media storage unit comprising:

an elongate web of flexible material;

a continuous zigzag fold within said elongate web of flexible material forming a plurality of overlying planes, each of said plurality of overlying planes having at least one edge which is integral with an adjacent overlying plane; and a bond between each two adjacent overlying planes extending generally from each edge which is integral with an adjacent overlying plane, at each end thereof, and terminating at a point which is X inches short of the midline of each overlying plane such that a plurality of fixed dimension adjacent storage pockets are formed, which, when said storage unit is extended, are separated by 2X inches.

10. The accordion pleated extendable media storage unit according to claim 9, wherein said elongate web of flexible material comprises cloth.

11. The accordion pleated extendable media storage unit according to claim 10, wherein said cloth comprises non-woven polyester spun material.

12. The accordion pleated extendable media storage unit according to claim 9, wherein each of said overlying planes is generally circular in shape.

13. The accordion pleated extendable media storage unit according to claim 9, wherein said bond is formed utilizing a sonic welding technique.

14. The accordion pleated extendable media storage unit according to claim 9, wherein said bond is formed by sewing.

15. The accordion pleated extendable media storage unit according to claim 9, wherein said bond is formed utilizing glue.

16. The accordion pleated extendable media storage unit according to claim 9, wherein said bond is continuous from each bottom edge which is integral with an adjacent overlying plane, at each end thereof, to said selected point on each side edge of each two adjacent overlying planes.

17. An accordion pleated extendable storage unit comprising:

an elongate web of flexible material;

a continuous zigzag fold within said elongate web of flexible material forming a plurality of overlying planes, each of said plurality of overlying planes having a bottom edge, two side edges, and a top edge and wherein at least one of said edges is integral with an adjacent overlying plane;

a bond between each two adjacent overlying planes above each bottom edge which is integral with an adjacent overlying plane, at each end thereof, terminating at a selected point on each side edge of each two adjacent overlying planes below the midline of each overlying plane wherein a plurality of adjacent storage pockets are formed on a first side of said elongate web of flexible material; and a bond between each two adjacent overlying planes below each top edge which is integral with an adjacent overlying pane, at each end thereof, terminating at a selected point one each side edge of each two adjacent overlying planes above the midline of each overlying plane wherein a second plurality of adjacent storage pockets are formed on a second side of said elongate web of flexible material.

18. The accordion pleated extendable media storage unit according to claim 17, wherein said elongate web of flexible material comprises cloth.

19. The accordion pleated extendable media storage unit according to claim 17, wherein said cloth comprises non-woven polyester spun material.

20. The accordion pleated extendable media storage unit according to claim 17, wherein each of said overlying planes is generally circular in shape.

21. The accordion pleated extendable media storage unit according to claim 17, wherein said bond is formed utilizing a sonic welding technique.

22. The accordion pleated extendable media storage unit according to claim 17, wherein said bond is formed by sewing.

23. The accordion pleated extendable media storage unit according to claim 17, wherein said bond is formed utilizing glue.

24. The accordion pleated extendable media storage unit according to claim 17, wherein said bond between each two adjacent overlying planes above each bottom edge which is integral with an adjacent overlying plane, at each end thereof, terminating at a selected point on each side edge of each two adjacent overlying planes below the midline of each overlying plane is continuous from each end of said bottom edge which is integral with an adjacent overlying plane to said selected point on each side edge of each two adjacent overlying planes below the midline of each overlying plane.

25. The accordion pleated extendable media storage unit according to claim 17, wherein said bond between each two adjacent overlying planes below each top edge which is integral with an adjacent overlying plane, at each end thereof, terminating at a selected point on each side edge of each two adjacent overlying planes above the midline of each overlying plane is continuous from each end of said top edge which is integral with an adjacent overlying plane to said selected point on each side edge of each two adjacent overlying planes above the midline of each overlying plane.

* * * * *